United States Patent [19]
Simon

[11] 3,841,000
[45] Oct. 15, 1974

[54] REEL CLOSURE

[76] Inventor: Warner H. Simon, 6511 Comanche Ave., Canoga Park, Calif. 91306

[22] Filed: Mar. 26, 1973

[21] Appl. No.: 344,480

[30] Foreign Application Priority Data
Mar. 30, 1972 Great Britain.................. 14934/72

[52] U.S. Cl.................... 34/242, 188/65.1, 219/74, 277/115, 432/242
[51] Int. Cl........................................... F26b 25/00
[58] Field of Search........ 34/15, 242; 277/115, 170, 277/127; 188/65.1; 432/242

[56] References Cited
UNITED STATES PATENTS

| | | | |
|---|---|---|---|
| 2,069,056 | 1/1937 | Barry | 277/115 |
| 2,974,512 | 3/1967 | Carter | 34/242 |
| 3,013,825 | 12/1961 | Wilson | 277/115 |
| 3,108,176 | 10/1963 | Simon | 219/74 |

Primary Examiner—Kenneth W. Sprague
Assistant Examiner—James C. Yeung
Attorney, Agent, or Firm—Howard A. Silber

[57] ABSTRACT

A reel closure is used with a spooled wire reel of the type wherein welding wire is maintained in an inert gas atmosphere. The closure includes a cooperating piston and valve seat which are biased so as to compress a sealing member against wire emergent from the reel. This provides a hermetic seal preventing escape of inert gas from the reel when wire is not being withdrawn. When the piston is actuated, compression of the sealing ring is relieved, permitting withdrawal of welding wire via a passageway through which the inert gas also can flow to protect the wire from atmospheric contamination. An optional locking device prevents withdrawal of wire while the sealing ring is compressed.

9 Claims, 4 Drawing Figures

REEL CLOSURE

BACKGROUND OF THE INVENTION

1. Field of the Invention

This invention relates to spooled wire reels and is particularly, but not necessarily exclusively, concerned with the shielding by an inert gas atmosphere of a wire for use in gas-shielded arc welding.

2. Description of the Prior Art

In gas-shielded arc welding, it is highly desirable, if not essential, to prevent contamination of the welding wire by the gases hydrogen and oxygen, both of which are available in the atmosphere. Welding wire metals have a high affinity to these gases and the weld quality can be adversely affected, even by minute traces of these gases picked up from the environment.

It has already been proposed (as in the inventor's U.S. Pat. No. 3,108,176) that a spooled wire reel particularly for use in gas-shielded arc welding should be provided with an inert atmosphere by providing a reel housing containing the spool which is given an inert atmosphere such as an argon atmosphere. The reel is suitably valved so that the atmosphere is maintained within the housing, the outlet from the reel housing through which the wire is taken being such as to allow the simultaneous release of the inert atmosphere through that opening, thereby surrounding the wire during its passage to the point at which welding takes place.

It is the object of the present invention to provide an improved controlled outlet from a spooled wire reel housing.

Another object of the invention is to provide a locking device for gripping the wire to prevent withdrawal when the valved outlet is conditioned to seal the wire outlet passageway. A method of welding, using the inventive apparatus, also is disclosed.

SUMMARY OF THE INVENTION

According to the present invention, an outlet from a spooled wire reel housing comprises a body secured to the housing, the body containing an inlet through which wire is passed from a reel within the housing, a piston having a central orifice through which the wire is passed and an outlet from which the wire is led, there being at the end of the outlet facing the piston a valve seating which cooperates with an enlarged tapered bore at the end of the orifice through the piston to define a chamber containing an O-ring, the piston being spring-loaded towards the seating, and there being a pressure gas inlet into the body to the side of the piston opposite to the springs.

With the reel housing not in use, pressure gas is disconnected from the outlet housing, thereby enabling the spring or springs associated with the piston to urge the piston towards the valve seating. The inclined wall of the enlarged bore cooperates with the valve seating, causing the O-ring to be compressed around the wire, thereby preventing the free passage of wire from within the reel housing and preventing the escape of the atmosphere from within the housing. In this condition, the reel housing may be transported from locality to locality while maintaining its atmosphere, thereby preventing contamination of the wire on the reel within the housing.

When in service, pressure gas is applied to the outlet housing, thereby applying pressure to the opposite side of the piston to overcome the spring bias and thereby causing the piston to move away from the valve seating, thus relieving the compression on the O-ring around the wire. This enables wire to be drawn from the reel and at the same time allows the atmosphere within the housing to escape around the wire, thereby maintaining its inert gas protection against contamination.

Thus, in its application to inert gas welding, the gas pressure admitted to urge the piston in opposition to the springs may be sequenced in accordance with the welding operation being performed, so that gas pressure is intermittently supplied to maintain the gas atmosphere within the reel housing when welding is not being effected.

When the atmosphere of the reel housing is being utilized to protect the wire on its passage to the point of weld, it is necessary to admit further inert gas to the reel housing through a valved inlet to that housing. This is done for two reasons; (a) to protect the filler wire on its passage to the arc, and (b) to replace the volume of wire being removed from the reel housing.

According to a further feature of the invention, a method of arc welding metals comprises feeding a filler rod or wire to the arc from a hermetically sealed container pressurized with an inert gas, feeding the filler rod from the pressurized container to the arc and continuously blanketing the filler rod with a shielding gas between the pressurized container and the arc, the filler rod being continuously shielded by providing a valved outlet from the pressurized container of the type hereinbefore defined.

With the pressure air disconnected from the body secured to the housing and with the sealing ring compressed around the wire, the frictional grip of the sealing ring on the wire prevents withdrawal of the wire from the body. However, if excessive force is applied to the wire, it is possible to damage the sealing ring, and accordingly, it is preferred to provide an additional locking means capable of preventing accidental withdrawal of the wire when the pressure air is disconnected. Therefore, according to a further feature of the invention, a locking device capable of gripping the wire is provided in the body, the locking device being caused to grip and disconnect from the wire in accordance with the position of the piston.

The locking device may simply be a member pivotally secured in the body and having a transverse hole through which the wire passes, the "free" end of the member being spring-urged away towards the piston. Thus, with pressure air connected to the body, movement of the piston to release the sealing ring from the wire causes the piston to contact the pivotal member and cause it to pivot against its spring loading, to a position where the hole through the member becomes coaxial with the wire. In this position, the wire can pass freely through the hole in the member. On disconnection of the pressure air, the springs associated with piston move it to cause the sealing ring to close onto the wire. This allows the spring associated with the pivotal member to cause the member to pivot until diametrically opposite points at opposite ends of the hole contact opposite sides of the wire and effectively grip the wire. Any accidental longitudinal loading of the wire in this condition is borne by the locking device and not by the sealing ring.

BRIEF DESCRIPTION OF THE DRAWINGS

A detailed description of the invention will be made with reference to the accompanying drawings, wherein like numerals designate corresponding parts in the several figures. These drawings, unless otherwise indicated, are to scale.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Structural and operational characteristics attributed to forms of the invention first described also shall be attributed to forms later described, unless such characteristics obviously are inapplicable or unless specific exception is made.

Figure 1:
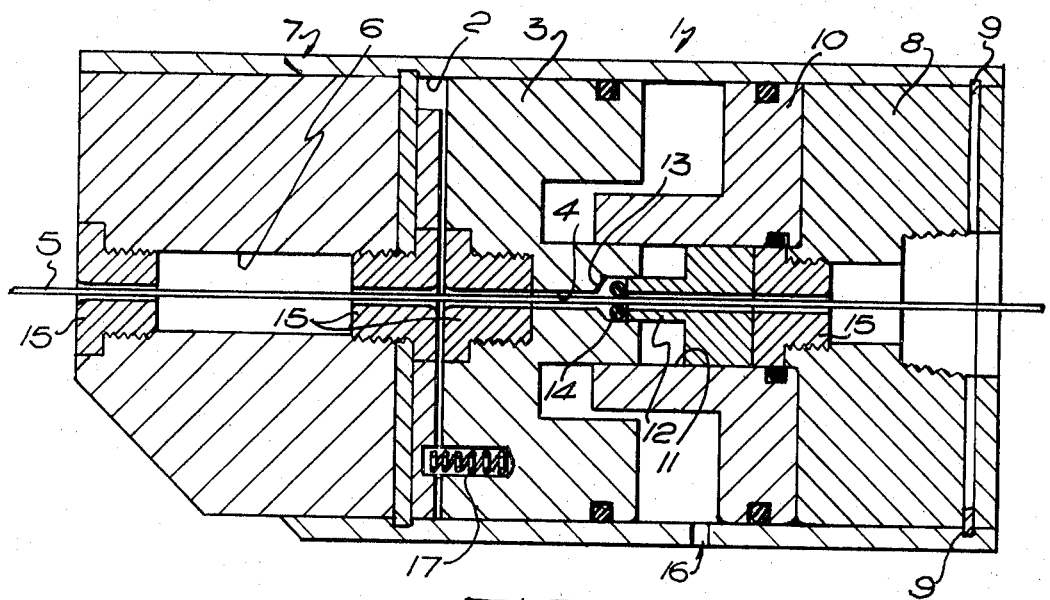
FIG. 1 is a sectional side elevation of one embodiment of outlet from a spooled wire reel according to the invention.
Figure 2:
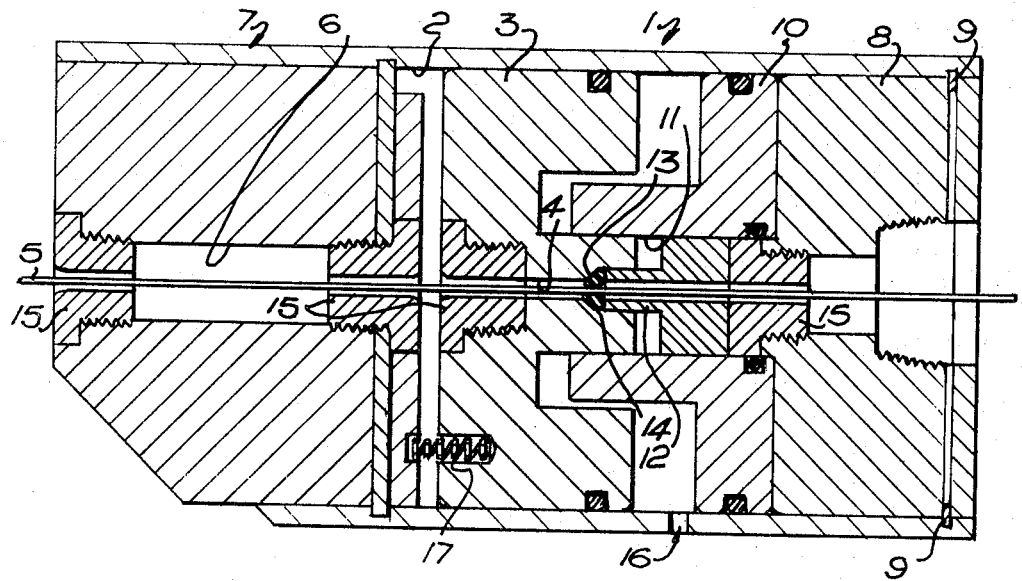
FIG. 2 corresponds to FIG. 1, but shows the outlet in a "closed" position.

FIGS. 1 and 2 show a body 1 to be secured to the outlet from a spooled wire reel (not shown), the body 1 forming a cylinder 2 for a piston 3. The piston 3 has a central orifice 4 for the passage of welding wire 5, the hole 4 being in line with a hole 6 in an inlet section 7 to the body, which section is adapted to be secured to the outlet from the spooled wire reel. On the other side of the piston to the inlet section, and within the cylinder, is an outlet section 8 held in the cylinder by a snap ring 9, supporting an intermediary section 10 having an enlarged bore 11 housing a valve seat 12, there being passageways through the valve seat, intermediary and outlet sections in line with the orifice through the piston. The orifice through the piston 3 has an enlarged tapered bore 13 which cooperates with the end of the valve seat 12 to form a chamber housing a sealing ring 14. The passageways through the so constituted body, and the orifice through the piston are provided with hard wear-resistant guides 15.

In the cylinder wall, there is provided an entrance port 16 between the intermediary section 10 and the piston 3, and the piston 3 is spring-urged by compression springs 17 (preferably three such springs) towards the intermediary section 10.

Thus, as is shown in FIG. 1, with pressure air admitted through the port 16, the piston is moved away from the intermediary section 10 when the enlarged tapered bore 13 to the piston orifice is brought clear of the valve seat, in which position, the sealing ring 14 does not bear on the wire. The wire can thus move freely through the body from the spooled wire reel. Simultaneously the inert gas atmosphere in the reel also passes through the body to maintain a gas shield round the wire as it passes through the atmosphere to a welding station, to prevent contamination. Obviously, on release of the atmosphere from the reel, it is necessary to supply inert gas to the reel for the length of time that wire is being removed.

When wire is not to be dispensed from the reel, or when the reel is in transit, pressure air is disconnected from the port 16, when the springs 17 urge the piston and thus the tapered bore 13 towards the valve seat. The sealing ring 14 is thus trapped and compressed into contact with the wire thereby preventing escape of the atmosphere from within the spooled wire reel.

While the construction of FIGS. 1 and 2 provides distinctly improved means of maintaining a gas shield around wire being withdrawn from the reel and maintaining the atmosphere within the reel when wire is not being withdrawn, great reliance is placed on the effectiveness of the sealing ring 14. To prevent damage to the sealing ring when it is gripping the wire, e.g., by accidental application of longitudinal force on the wire, an additional locking device can be provided.

Figure 3:
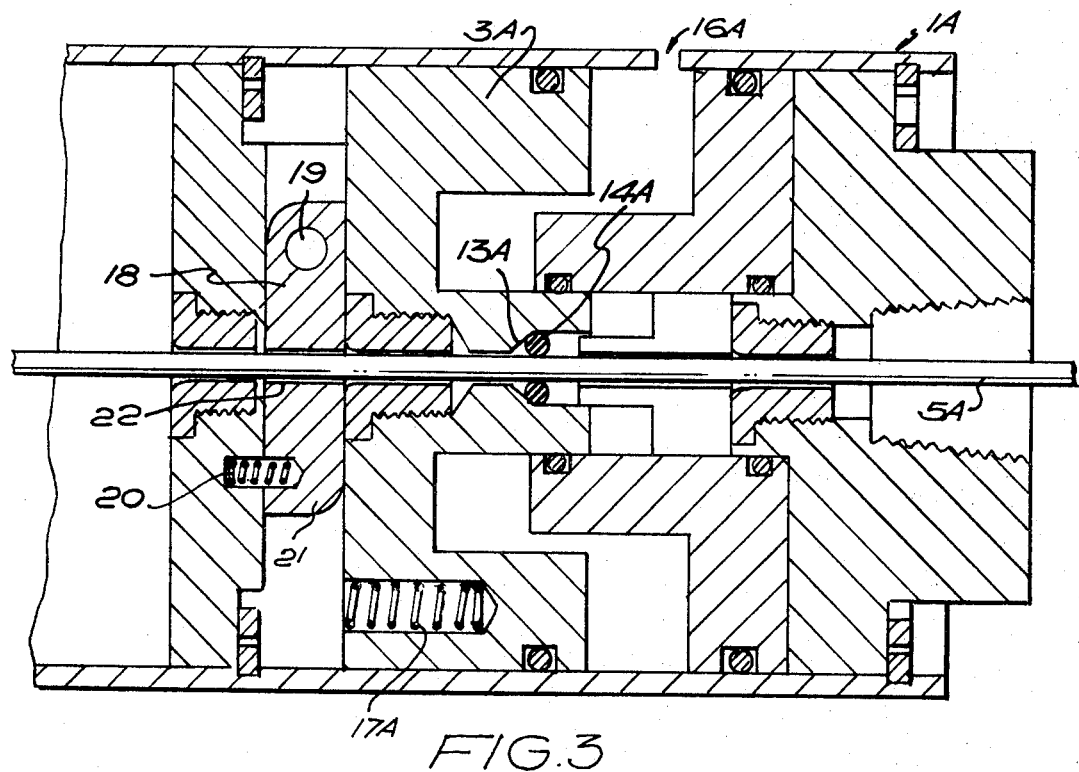
FIG. 3 corresponds to FIG. 1, but shows a second embodiment of outlet according to the invention.
Figure 4:
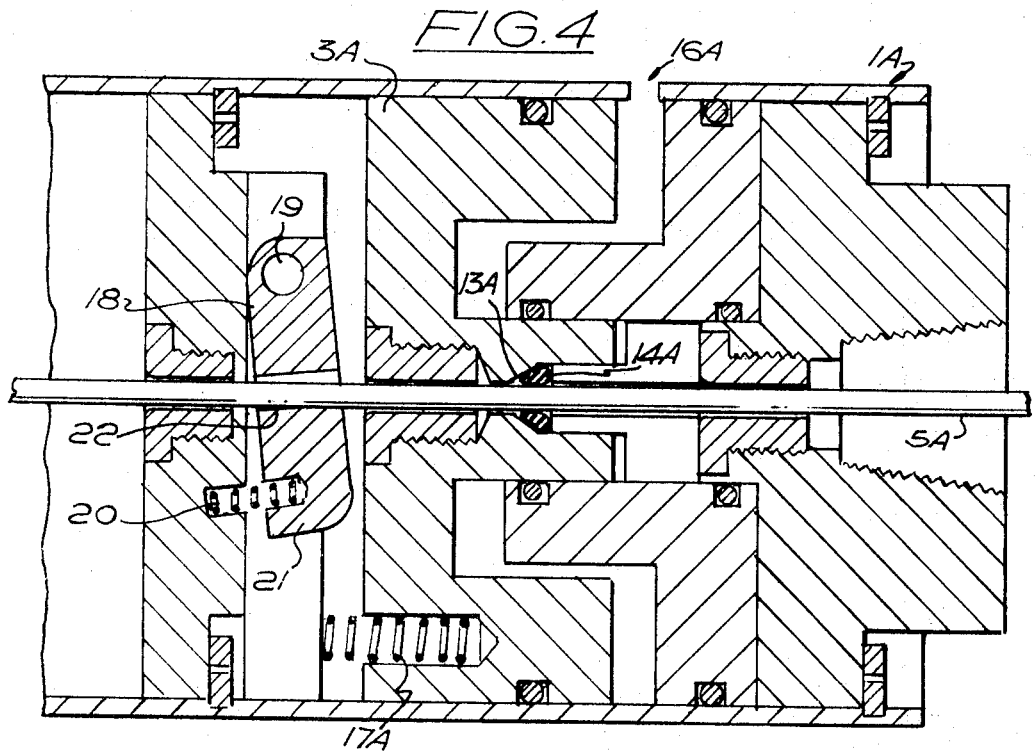
FIG. 4 corresponds to FIG. 3, but shows outlet in a "closed" position.

Thus, as is shown in FIGS. 3 and 4, in a body 1A having substantial identity with the body 1 except for minor constructional differences, a member 18 is provided within the cylinder on the side of the piston 3A opposite to the enlarged tapered bore 13A. The member is pivotally secured within the cylinder at 19. A compression spring 20 bears against the lower end 21 to urge the lower end towards the piston about the pivot 19. As is shown by FIG. 3, with pressure air admitted through the port 16A the piston 3A is moved in substantially the same manner as the piston 3 of FIGS. 1 and 2 to release the sealing ring 14A from the wire 5A. At the same time the member 18 is contacted by the piston and swings about its pivot 19 until a hole 22 through the member is in line with the orifice 4A through the piston. On release of the pressure air, springs 17A cause the piston to close the sealing ring 14 on the wire. As the piston moves, the spring 20 swings the member 18 about the pivot 19 until opposite sides of the opposite ends of the hole 22 contact and effectively grip the wire 5A. Any accidental loading of the wire then taken by the additional locking device and damage to the sealing ring is prevented.

Preferably, the inlet to the outlet body and the various guides for the wire through that body are formed from hard ceramic material of suitable wear-resistant quality.

Intending to claim all novel, useful and unobvious features shown or described, the inventor makes the following

I claim:

1. An outlet from a spooled wire reel housing comprising a body secured to the housing, the body containing an inlet through which wire is passed from a reel within the housing, a piston having a central orifice through which the wire is passed and an outlet from which the wire is led, there being at the end of the outlet facing the piston a valve seating which cooperates with an enlarged tapered bore at the end of the orifice through the piston to define a chamber containing an O-ring, the piston being spring-loaded towards the seating, and there being a pressure gas inlet into the body to the opposite side of the piston to the springs.

2. An outlet as defined in claim 1, wherein the inlet to the outlet body and the various guides for the wire through that body are formed from hard ceramic material of suitable wear-resistant quality.

3. An outlet as defined in claim 1, wherein a locking device capable of gripping the wire is provided in the body, between the piston and an end wall to the body, the locking device being caused to grip and disconnect from the wire in accordance with the position of the piston.

4. An outlet as defined in claim 3, wherein the locking device is a member pivotally secured in the body and having a transverse hold through which the wire passes, the "free" end of the member being spring-urged away towards the piston.

5. For use in conjunction with a spooled wire reel of the type wherein welding wire is maintained in an inert atmosphere, an outlet mechanism facilitating withdrawal of wire from said reel while blanketed with said inert gas, and facilitating hermetic closure of said reel when wire is not being withdrawn, said mechanism comprising:
   a body attachable to the outlet of said reel,
   a cooperating pair of relatively moveable components within said body, there being a passageway for said wire from said reel outlet through both of said pair of components,
   annular resilient sealing means situated between said cooperating pair of components, wire emergent from said reel passing through said passageway and through said sealing means, said components being biased toward each other to compress said sealing means against said wire to prevent escape of said inert gas through said passageway when said wire is not being withdrawn, and
   means for urging separation of said relatively moveable components to relieve said sealing means, thereby permitting withdrawal of wire from said reel with concurrent flow of inert gas through said passageway to protect said wire from atmospheric contamination.

6. An outlet mechanism according to claim 5 wherein said cooperating relatively moveable components include a valve seat affixed to said body and a piston moveable within said body toward and away from said valve seat, wherein said sealing means comprises an annular sealing ring situated between said piston and said valve seat, and further comprising spring means for biasing said piston toward said valve seat, the facing surfaces of said piston and valve seat being configured to compress said sealing ring into sealing engagement with said wire when said piston is biased toward said valve seat.

7. An outlet mechanism according to claim 6 wherein said means for urging separation comprises a chamber within said body facing said piston, and a fluid inlet leading through said body to said chamber, introduction of fluid into said chamber urging said piston away from said valve seat, thereby relieving compression of said sealing ring to permit withdrawal of wire from said reel.

8. An outlet mechanism according to claim 5 further comprising means, within said body, for gripping said wire to prevent withdrawal thereof when said relatively moveable components are biased to a position in which said sealing means is compressed against said wire.

9. An outlet mechanism according to claim 6 further comprising:
   a gripping member pivotally mounted within said body on the other side of said piston from said valve seat, said gripping member having an opening through which passes wire from said reel, said member being biased in one rotational direction toward a pivotal position in which said wire is gripped by the edges of said opening, said gripping member being rotated in a direction opposite said one rotational direction by movement of said piston away from said valve seat, said opening thereby being rotated toward alignment with said passageway so that the grip on said wire is released.

* * * * *